Dec. 2, 1947. M. L. PUGH 2,431,707

BATTERY CHARGING APPARATUS

Filed July 6, 1945

INVENTOR.
Merlin L. Pugh.
BY Bair & Freeman
Atty's.

Patented Dec. 2, 1947

2,431,707

UNITED STATES PATENT OFFICE 2,431,707

BATTERY CHARGING APPARATUS

Merlin L. Pugh, Minneapolis, Minn.

Application July 6, 1945, Serial No. 603,454

13 Claims. (Cl. 320—20)

My present invention relates to an apparatus for charging storage batteries at a high rate and in accordance with the condition of the battery.

One object of the invention is to provide an apparatus which can be electrically connected with a storage battery while it is in an automobile or the like, and the apparatus adjusted for determining the condition of the battery and for simultaneously adjusting a time switch which will effect charging of the battery for a time period compatible with the tested reading for the battery when a charging control switch is subsequently adjusted for charging the battery at a predetermined high rate.

Another object is to provide a battery charging apparatus which includes adjustable mechanism for testing the battery to see if it is feasible to charge it at a high rate, and at the same time (if the battery can be charged at a high rate) effecting movement of a testing indicator needle to a predetermined point, a time switch being simultaneously adjusted so that the only operation necessary for the user is to effect a single adjustment until the indicator needle reaches that predetermined point whereupon the time switch will be automatically set for charging the battery for a time period corresponding to that required by the particular condition of the battery being tested.

Still another object is to provide a test for the battery under load wherein the load is automatically thrown across the battery by movement of the time switch from its "Off" position, whereupon the indicating needle of a battery condition indicator, such as a voltmeter, will be moved to show what the battery tests, and at the same time a rheostat adjusts the current to the voltmeter in such relation to the position of the time switch that when the indicator needle reaches a predetermined point on the voltmeter the time switch has reached the particular setting required for charging the battery connected with the charging apparatus, the charge control switch then being operable to open the load circuit before the charge control switch is adjusted to a charging position.

A further object is to provide a battery charging apparatus wherein a complicated testing technique is eliminated and in place of it a time switch is adjusted until a battery condition indicator indicates a predetermined point, and thereafter the charge control switch can be adjusted for the recommended charging rate, the entire testing and setting of the apparatus for charging a battery being thereby reduced to the two operations of adjusting the time switch and the charge control switch.

With these and other objects in view, my invention consists in the construction, arrangement and combination of the various parts of my device whereby the objects contemplated are attained as hereinafter more fully set forth, pointed out in my claims, and illustrated in the accompanying drawings, in which:

Figure 1:
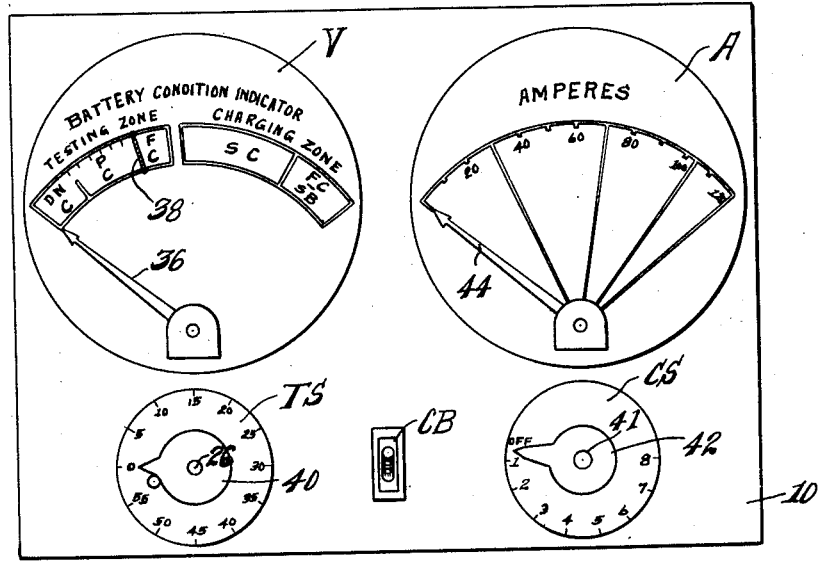
Fig. 1 is a plan view of a control panel for my charging apparatus.
Figure 2:
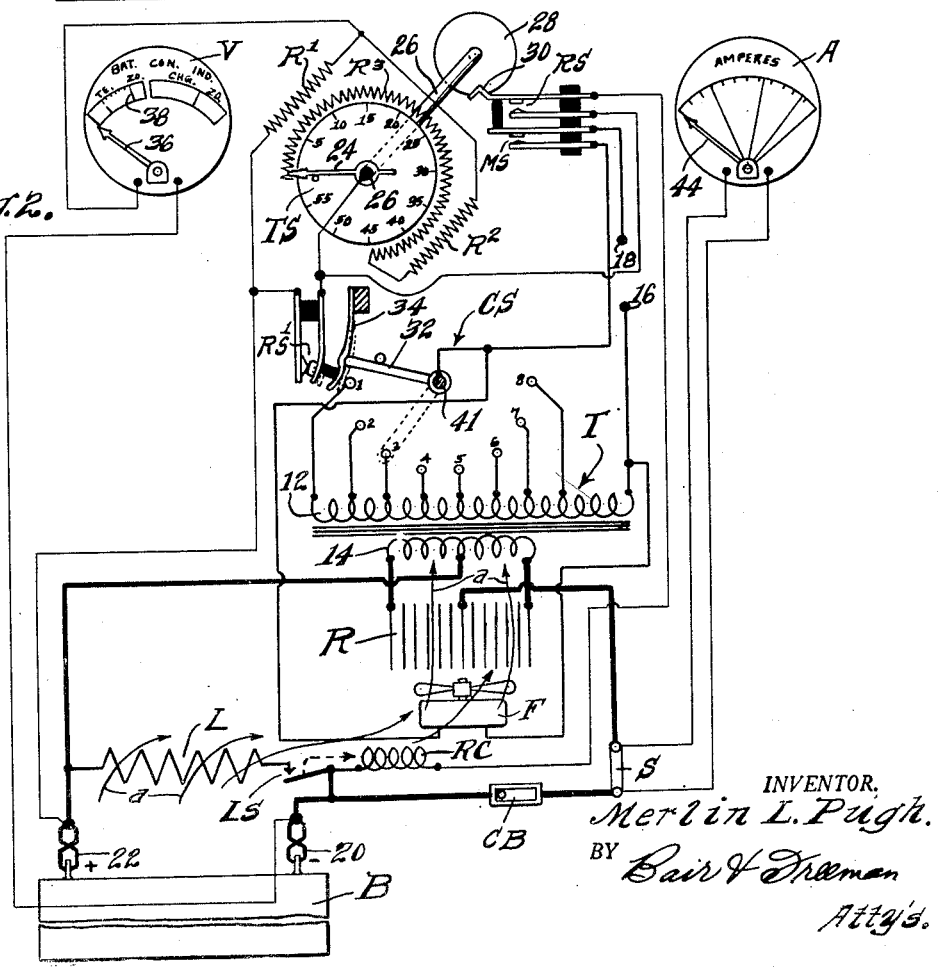
Fig. 2 is an electro-diagrammatic view of the apparatus with the indicators and control devices of Fig. 1 connected therein.

On the accompanying drawing I have used the reference numeral 10 to indicate a panel on which is mounted an ammeter A and a battery condition indicator such as a voltmeter V. A time switch TS of known type having clock actuated, spring-returned mechanism, a charge control switch CS and a circuit breaker CB are also mounted on the panel 10. These instruments may be mounted on the top of a suitable housing in which a transformer T, a rectifier R, a fan F, a load coil L and a relay comprising a relay coil RC and a load switch LS are mounted. These elements are shown in Fig. 2. The transformer T has a primary coil 12 and a secondary coil 14.

The primary 12 is adapted to be energized as by 110 volt current supplied to terminals 16 and 18. The fan F is also adapted for being energized from the terminals 16 and 18, the transformer and the fan being under control of a master switch MS. The fan F is located so as to dissipate heat from the rectifier R and also from the load coil L, which load coil may carry as high as 150 to 175 amperes of current from the storage battery B.

The primary circuit for the transformer T, and the circuit for the fan F are shown in medium weight lines, whereas the secondary circuit is shown in heavy lines, this circuit being for charging and discharging the battery B. The battery B of course is the storage battery of an automobile or the like and it is connected to the secondary circuit by a pair of heavy spring clips 20 and 22. The circuits for the voltmeter V and the ammeter A are shown in light lines.

It will be noted that the secondary circuit includes a shunt S for the ammeter A, the ammeter being connected across this shunt. The circuit breaker CB is in the secondary circuit and automatically trips out if the clips 20 and 22 are connected in wrong polarity relationship to the terminals of the battery B. The voltmeter V is connected across the clips 20 and 22 with a resistor R¹ in series with the voltmeter for depressing the zero reading thereof. Shunting the resistor R¹ is a resistor R² and a resistor R³ in series with each other.

The resistor R³ is part of a rheostat, the movable blade of which is indicated at 24. The blade is mounted on a shaft 26, which shaft extends through and is connected with the timing mechanism of the time switch TS for setting it. The shaft 26 also has a cam 28 provided with a notch 30 for permitting a relay switch RS and the master switch MS to normally remain in open position, as shown in Fig. 2, and to return to open position after the time switch has been set and then returns to "0" position. The time switch TS may be provided with minutes of time indicia, if desired, although this is unnecessary except as a means to indicate how long the time switch will run after being set. When the time switch is at "0" position, the rheostat R³—24 is at that time in its maximum resistance position.

A second relay switch RS¹ is in series with the relay switch RS and these two switches are in series with the relay coil RC, the three being connected across the clips 20 and 22. When the relay coil is energized it closes the load switch LS.

The charge control switch CS has a movable blade 32 for coaction with contacts numbered 1 to 8, inclusive. The blade 32 in the "off" position of Fig. 2 engages a leaf spring 34 for closing the relay switch RS¹. Whenever the blade 32 is moved from the "off" position to any of the contacts such as 3, as shown by dotted lines, the switch RS¹ opens.

*Practical operation*

In the operation of my battery charging apparatus, when the parts are in the position of Fig. 2, that is, with the time switch TS at "0" position and the charge control switch CS at "off" position, the clips 20 and 22 may be connected to the terminals of a storage battery and the voltmeter V will give a reading which, however, has no particular significance as far as testing the battery is concerned. In order to test the battery it is necessary to test its voltage while a load is applied across the battery.

The operator then rotates the time switch TS from the "0" or "off" position which causes the cam 28 to close the switches RS and MS and reduce the resistance in the resistor R³. Closure of the master switch MS causes the fan F to operate (for subsequently dissipating heat from the rectifier R and from the load coil L) and supplies current to the charging switch blade 32. Closure of the switch RS energizes the relay coil RC so that the load switch LS closes to thereby throw the load L across the terminals of the battery B. This will cause the indicating needle 36 to drop to a lower reading, because the battery is discharging, and accordingly a true test of the battery can now be made on the voltmeter. If the battery is partially discharged the needle will fall in a region indicated as PC or partly charged.

The timer switch TS is now adjusted further clockwise which causes the resistance in the rheostat R³—24 to be gradually reduced and this increases the flow of current through the voltmeter so that the needle 36 swings further toward the right. When it reaches the black line indicated at 38, this indicates to the operator that the time switch TS has been properly adjusted and he can then release the knob 40 of the time switch.

The next step in the operation is to adjust the charge control switch CS by rotating its knob 42 to one of the numbered positions where the needle 44 of the ammeter will swing upwardly as to between 80 and 100 amperes, depending on the recommended charging rate for the particular charging apparatus that the operator has. This causes the arm 32 to leave the spring blade 34, thereby opening the relay switch RS¹ to effect de-energization of the relay coil RC and the load coil L, as it is desirable to remove the load of the coil L from the battery as soon as possible.

The transformer T is then in operation for charging the battery in conjunction with the rectifier R at the proper rate, and the charging will continue for the proper time, depending upon the position of the time switch knob 40 when the needle 36 reached the indicating mark 38 as a result of clockwise rotation of the timer switch knob 40, as already described.

The battery condition indicator V may be provided with other indicia in a "testing zone" such as DNC, indicating do not change, and FC, indicating fully charged, in addition to the zone PC and the indicating mark 38. In a "charging zone" it may have indicia such as SC, indicating start charge, and FC—SB, indicating finish charge or sulphated battery. This is for further testing and indicating the voltage of the battery during such further testing or during charging, but has no particular significance in connection with the invention herein disclosed.

The load coil L is preferably such that the battery discharge in amperes is comparable to the average discharge of automobile starter motors, and the indicating line 38 is approximately at a voltage of 5.4 to indicate a battery that does not need charging if the needle 36 is on the line 38 as soon as the timer switch TS is moved away from "0" position. This voltage value of course may be varied as desired, depending upon the relative resistance in the resistors R¹, R² and R³ and other factors. Once the manufacturer has determined what the value should be, the appropriate resistors and rheostat are used without the necessity of requiring any voltage reading, voltage interpretations, or calculations of any kind on the part of the operator.

From the foregoing description it will be obvious that I have provided a battery charging apparatus wherein the matter of setting the charger for proper time of charging is reduced to a single operation of rotating the timer switch TS until the needle 36 reaches the line 38 on the voltmeter V. This of course is done after the clips 20 and 22 are clipped to the battery. After the time switch TS is set, the charge control switch CS must be adjusted to cause the ammeter A to read for the proper recommended amperage, as the switch CS cannot always be set at the same point due to the capacity and internal resistance of successive batteries being different. Thus for a battery that can properly be charged at a high rate there are only three operations necessary, namely, (1) clipping the clips 20 and 22 on the battery, (2) rotating the knob 40 until the needle 36 reaches the mark 38, and (3) adjusting the charge control switch CS.

If, when the knob 40 is rotated from the "0" position, the needle 36 falls in the DNC portion of the testing zone, then the battery is either sulphated, badly discharged, or worn out, and it requires other than high rate charging to recondition the battery, as set forth in my co-pending application, Serial No. 377,117, filed February 3, 1941. When the needle falls in the PC or partly charged portion of the testing zone upon movement of the timer switch from "0" position, then the operator knows that the battery can be properly recharged at a high rate by my apparatus, and the necessary adjustment of the timer switch made until the needle reaches the indicator line 38. If the needle falls in the FC or fully charged portion of the testing zone then the operator knows that the battery needs no charge and the charging apparatus can be disconnected from it and the battery put back in service.

After the control switch CS has been adjusted from "off" position, the relay circuit for the coil RC is open, thus opening the load circuit, and the voltmeter V will now give a different reading because the resistors $R^2$ and $R^3$ are out of the circuit due to the opening of the switch $RS^1$ and due to the battery being charged rather than discharged. The needle 36, during charging, should fall in the start charge section SC of the charging zone on the voltmeter adjacent the lower or left end of the scale. The needle will gradually indicate a higher voltage by swinging toward the finish charge or sulphated battery portion FC—SB of the charging zone, the left end of the FC—SB portion of the zone being about 7½ volts. If the voltage then rapidly rises in this portion of the charging zone it indicates full charge. If the needle 36 falls in the FC—SB region at the start of the charge, this indicates a sulphated battery which cannot be charged at a high rate.

My apparatus is also useful for cycling a storage battery for timed periods (as when forming the plates, breaking down sulphation, or running capacity tests) by adjusting the time switch to the minutes desired for cycling and then leaving the switch CS in the Fig. 2 position so that the load coil L remains across the battery. During the cycling the fan F dissipates the heat from the coil L, it being physically located for drawing or blowing air across the coil as indicated by the arrows $a$.

Some changes may be made in the construction and arrangement of the parts of my machine without departing from the real spirit and purpose of my invention, and it is my intention to cover by my claims such modified forms of structure or use of mechanical equivalents as may be reasonably included within their scope.

I claim as my invention:

1. In a battery charging apparatus, a charging circuit including a time switch, a meter connected with the battery for indicating the voltage thereof, a manually variable rheostat in circuit with said meter and mechanically connected with said time switch for simultaneous operation therewith to indicate the proper time period for charging the battery in accordance with a predetermined reading on the meter and a load for the battery during the time the rheostat is being varied.

2. In battery charging apparatus of the character disclosed, a charging circuit including a time switch for controlling said circuit, a charge control switch, a rheostat manually variable in accordance with the setting of said time switch, a meter for the battery, the current thereto being varied by said rheostat, a load for the battery during the time the rheostat is being varied, and a switch for controlling the circuit through said rheostat operated by said charge control switch.

3. A battery charging apparatus comprising a charging circuit including a time switch, a meter connected with the battery for indicating the voltage thereof, a variable rheostat in circuit with said meter and connected with said time switch for simultaneous adjustment therewith to indicate the proper time period for charging the battery in accordance with one reading on the meter, and a load for the battery during such adjustment.

4. In battery charging apparatus a charging circuit including a time switch for controlling said circuit, a charge control switch, a rheostat variable in accordance with the setting of said time switch, a meter for the battery and in circuit with said rheostat, switching means for controlling the charging of the battery and the circuit through said rheostat operated by said charge control switch, and a load for the battery while adjusting said rheostat, said switching means effecting removal of the load from the battery when said switching means is adjusted for charging the battery.

5. In a battery charging apparatus, a charging circuit including a time switch, a meter connected with the battery for indicating the voltage thereof, a variable rheostat in circuit with said meter and connected with said time switch for simultaneous adjustment therewith to indicate the proper time period for charging the battery in accordance with a predetermined reading on the meter, a load for the battery during such adjustment, and means to remove said load from the battery while charging the battery.

6. Battery charging apparatus comprising a charging circuit including a time switch for controlling said circuit, a charge control switch, a battery condition indicator, a rheostat variable in accordance with the setting of said time switch and effecting the reading of said battery condition indicator, a switch for controlling the circuit through said rheostat operated by said charge control switch, and a load for the battery, said load being controlled by said charge control switch and said time switch in conjunction with each other.

7. In battery charging apparatus of the character disclosed, a charging circuit including a time switch for controlling said circuit, a charge control switch, a rheostat manually variable in accordance with the setting of said time switch, a load for the battery during the time the rheostat is being varied, a switch for controlling the circuit through said rheostat operated by said charge control switch, a master switch closed by movement of said time switch from "off" position, a relay switch for a relay that operates the load coil, said relay switch being in circuit with said switch controlled by said charge control switch, said charge control switch opening said last switch upon movement to charge-adjusting position.

8. In battery charging apparatus of the character disclosed, a charging circuit including a time switch for controlling said circuit, a charge control switch, a rheostat manually variable in accordance with the setting of said time switch, a load for the battery during the time the rheostat is being varied, a voltmeter adjusted thereby, a relay switch for controlling the circuit through said rheostat and operated by said control switch, a master switch for the charging circuit closed by movement of said time switch from "off" position, a load coil, a second relay switch for energizing said load coil, said second relay switch being in circuit with said first relay switch and being controlled by said charge control switch, said charge control switch opening said first relay switch upon movement to charge-adjusting position.

9. In a battery charging apparatus a charging circuit including a time switch for controlling said circuit, a charge control switch, a voltmeter and a rheostat variable in accordance with the setting of said time switch, a switch for controlling the circuit through said rheostat operated by said control switch, a master switch for the charging circuit closed by movement of said time switch from "off" position, and a load for the battery applied thereto while adjusting said time switch and said rheostat and removed therefrom when said master switch is moved from "off" position.

10. A battery charging apparatus comprising a charging circuit, a normally open master switch for controlling said circuit, a time switch movable to a plurality of positions including an "off" position, said time switch in said "off" position opening said master switch, and in all other positions closing said master switch, a voltmeter for testing the battery while a load is applied thereto, a rheostat for modifying the indication on said voltmeter in accordance with the position of said time switch, and a charge control switch which disconnects said load from the battery when said charge control switch is moved to charging position.

11. In a battery charging apparatus, a charging circuit, a master switch for controlling said charging circuit, a time switch for opening said master switch when the time switch is in "off" position, and closing the master switch when the time switch is in timing position, a battery condition indicator connected across the battery and modified in its indication by the position of said time switch, a load for the battery, and a pair of relay switches for controlling said load, one of said relay switches being opened by said time switch in the "off" position thereof and closed in all other positions of the time switch, and the other relay switch being in series with said first relay switch and openable after the time switch has been set.

12. In a battery charging apparatus, a charging circuit, a master switch for controlling said charging circuit, a time switch for opening said master switch when the time switch is in "off" position, and closing the master switch when the time switch is in timing position, a battery condition indicator connected across the battery and modified in its indication by the position of said time switch, a load for the battery, a pair of relay switches for controlling said load, one of said relay switches being opened by said time switch in the "off" position thereof and closed in all its other positions, the other relay switch being in series with said first relay switch, and a charge control switch for varying the rate of charge, said charge control switch, when in operative position, opening said second relay switch.

13. Battery testing and charging apparatus for high rate battery charging comprising a meter circuit adapted to be connected to terminals provided on the battery, a battery load circuit adapted to be connected to said battery terminals, a fixed load for said battery circuit, means for connecting said load into said battery load circuit during testing, a charging circuit, a time switch in the charging circuit containing time indicia thereon and a voltmeter connected in said meter circuit, a rheostat in said meter circuit operated by the setting of the time switch, said voltmeter including indicia for visually determining in time units, in conjunction with said time indicia on said time switch upon setting of the time switch, the amount of time required to substantially fully charge the battery, without the necessity of any calculations.

MERLIN L. PUGH.

REFERENCES CITED

The following references are of record in the file of this patent:

UNITED STATES PATENTS

| Number | Name | Date |
|---|---|---|
| 1,879,530 | Schaf, Jr. | Sept. 27, 1932 |
| 2,246,163 | Cheeseman | June 17, 1941 |
| 2,347,452 | Amsden | Apr. 25, 1944 |
| 2,354,877 | Peters | Aug. 1, 1944 |
| 2,366,505 | Fletcher | Jan. 2, 1945 |

FOREIGN PATENTS

| Number | Country | Date |
|---|---|---|
| 445,336 | Great Britain | Apr. 7, 1936 |